United States Patent [19]

Cortopassi et al.

[11] Patent Number: 5,335,996
[45] Date of Patent: Aug. 9, 1994

[54] OPENABLE BAG CONSTRUCTION

[75] Inventors: Jeffery J. Cortopassi, Hinsdale; Ronald Marsik, Willow Springs, both of Ill.; Raymond E. McDonald, Rochester, N.Y.; Nicholas M. Shymanski, Edison, N.J.

[73] Assignee: Bagcraft Corporation of America, Chicago, Ill.

[21] Appl. No.: 87,313

[22] Filed: Jul. 8, 1993

[51] Int. Cl.⁵ .................. B65D 30/08; B65D 30/10
[52] U.S. Cl. .................... 383/207; 383/66; 383/113; 383/116; 383/120; 229/87.05
[58] Field of Search ............... 383/200, 207, 209, 66, 383/111, 120, 127, 110, 113, 116; 229/DIG. 13, 122, 87.05, 87.08

[56] References Cited

U.S. PATENT DOCUMENTS

| | | | |
|---|---|---|---|
| 1,329,466 | 2/1920 | Miller | 229/87.05 X |
| 2,027,791 | 1/1936 | Schrager | 229/87.05 X |
| 2,128,374 | 8/1938 | Midulla | 229/87.05 |
| 2,306,335 | 12/1942 | Feigenbutz | 383/207 |
| 2,923,456 | 2/1960 | Ryan | 383/200 |
| 3,104,047 | 9/1963 | Weeks | 383/200 |
| 3,227,359 | 1/1966 | Hanlon | 383/207 |
| 3,451,539 | 6/1969 | Wysocki | 229/87.05 X |
| 4,608,259 | 8/1986 | Cortopassi | 229/DIG. 13 X |
| 4,777,054 | 10/1988 | Greenhouse | 383/209 X |
| 4,917,247 | 4/1990 | Jud | 383/207 |

FOREIGN PATENT DOCUMENTS 1145885 3/1969 United Kingdom ............ 229/87.05

*Primary Examiner*—Allan N. Shoap
*Assistant Examiner*—Jes F. Pascua

[57] ABSTRACT

A bag for carrying and exposing a food item, usually of the hamburger-type sold at fast-food or convenience stores. The bag includes front, back and gusseted side panels which are interconnected and form a V-shaped closed end and an open end. A pair of lines of weakness or perforations are provided in the bag, one along the junction of each side panel and the front panel and extending between the open and closed ends. A pair of slits, one member associated with each line of perforation and extending from the bag open end to the respective perforation line. A second set of slits can be provided at open end of each of the non-perforated side panel/back panel junctions can be provided. The bag having a width or the distance between the lines of perforations being substantially equal to the width of the front panel. Thus the bag can be opened by tearing along the perforations so as to expose the bag interior and an item therein for removal, application of condiments, and/or reuse of the bag. Moreover, the bag is fabricated of a multi-purpose laminate having layers of tissue, adhesive, polycoat tissue and polyethylene. This laminate functions to enhance moisture and heat retention within the package and imprinting capability.

8 Claims, 1 Drawing Sheet

U.S. Patent
Aug. 9, 1994
5,335,996
FIG. 1
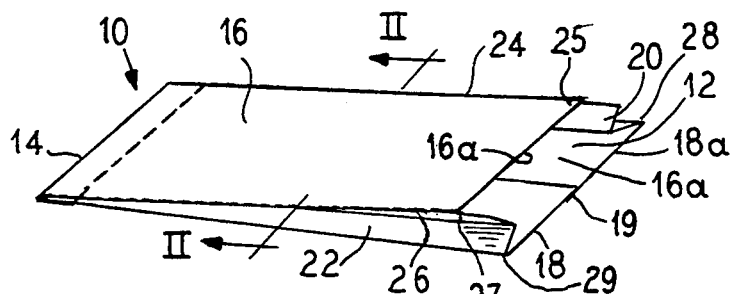
FIG. 2
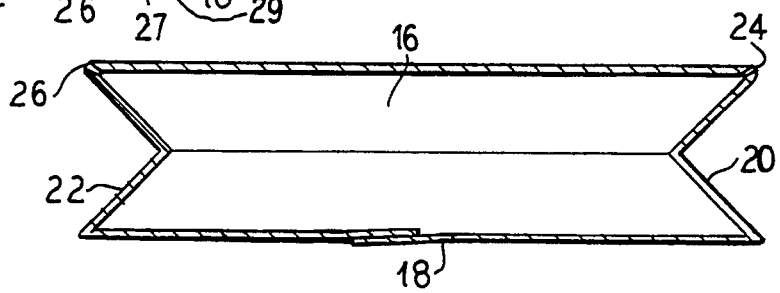
FIG. 3
FIG. 1A
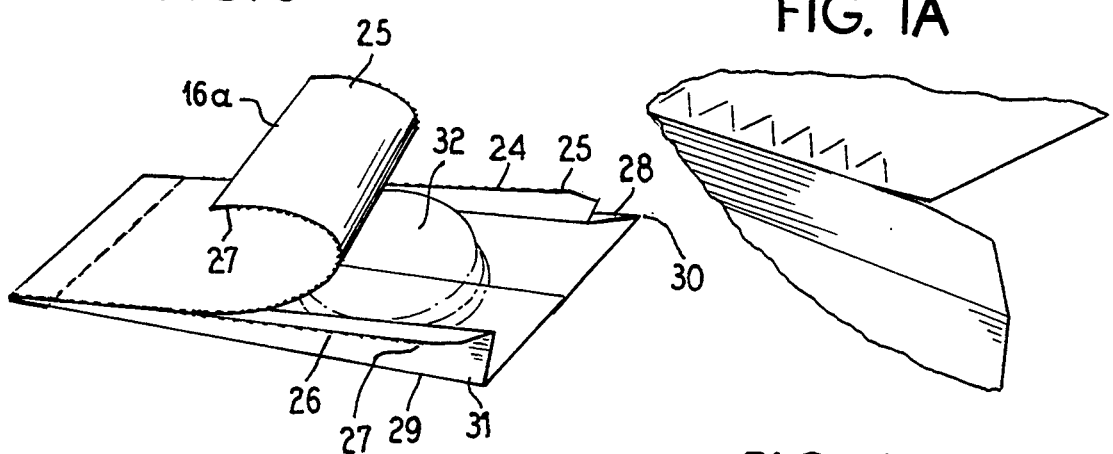
FIG. 4
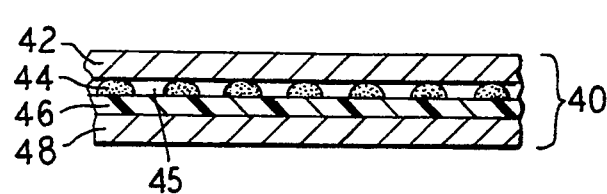

OPENABLE BAG CONSTRUCTION

BACKGROUND OF THE INVENTION

This invention relates to paper bags, and more specifically, to the type used in the convenience food industry to carry a food item such as a sandwich and to be opened to expose the bag interior and food item.

In the convenience or fast food industry, the package, a bag or a sandwich wrap, in which a product is packaged is important. Bags seem to be becoming more popular. The importance generally relates to the quality of the bag: (a) from the customer's perspective as related to factors such as appearance, ease of use and heat and moisture retention; and (b) from the operator's point of view as to factors such as customer acceptance, speed of use, cost of packaging, etc. Presently, it is believed that the bags can be improved by providing easier and better access for the customer to the item carried therein.

Thus it is an object of this invention to provide improved packaging for fast food establishments.

Bags such as that disclosed in U.S. Pat. No. 2,306,335, Feigenbutz, are used in the sale of fried chicken. The bag is of the automatic type, has a square or flat bottom, and can stand upright for loading. The bag includes a pair of closely spaced parallel lines of perforations extending longitudinally from top to bottom of the bag with both lines of perforation located in the front panel and adjacent the longitudinal center thereof. The perforations also extend through the top which may be stapled closed. The top perforations form a pull tab for opening the bag and providing access to the chicken which is then removed from the bag through the narrow slot or opening formed by tearing along the perforation. While the disclosed bag may be useful for fried chicken, it is not believed useful for softer or more deformable items, such as hamburgers. It is believed that customers desire access to the food item and to remove the item without distorting or damaging the same. This cannot be done with the bag disclosed in Feigenbutz. Moreover, the customer may wish to apply condiments to the sandwich and then reuse the bag.

It is another object of this invention to provide a bag system wherein the item to be carried is a sandwich, where the bag can be opened wide to permit easy access to and removal of the sandwich, and where the bag can be opened in such a manner that condiments can be applied to the sandwich and the bag then be reused.

It is yet another object of this invention to provide a bag which is useful with hamburger-like sandwiches, and which can be imprinted with logos and other advertisements.

These and other objects of this invention will become apparent from the following disclosure and appended claims.

SUMMARY OF THE INVENTION

The bag of this invention meets the foregoing objects in that it provides desirable packaging for fast-food products, provides for easy access to the bag interior and sandwich removal and provides a bag fabricated of a material which exhibits moisture and heat retention and imprinting characteristics.

The bag is of the pinch bottom type, lies flat, and includes an open end, a closed end, and front, back and gusseted side panels. A pair of lines of weakness or perforations are provided that extend between the open top and closed bottom. These lines are located at the side scores or junction of each side panel with either the front or the back panel, preferably the front panel. Thus the lines of weakness may be spaced apart by a panel such as the front panel. Moreover, slits are provided at the front end of the perforations (i.e., adjacent the open end) for assisting in opening. As discussed hereinafter, a second pair of slits can be provided with one at the beginning of each solid score (i.e. non-perforated). With the foregoing construction the food item can be inserted in the bag and then the bag can be opened and torn open along the perforations so as to expose the bag interior or contents for access or removal of the sandwich, application of condiments and/or reuse of the bag, for example, as a place mat.

Moreover, the bag is fabricated of a laminate having layers of (from interior to exterior) tissue paper/adhesive/polycoat/paper which exhibits the desired moisture and heat retention and imprinting characteristics.

This combination of bag structure and material has provided a unique bag for use in fast food establishments.

BRIEF DESCRIPTION OF THE DRAWINGS

FIG. 1 is a perspective view of a bag of this invention;

FIG. 1A is an enlarged view of a section of the perforation pattern used in a bag of the type shown in FIG. 1.

FIG. 2 is a sectional view of the bag taken along line II—II of FIG. 1;

FIG. 3 is a perspective view of a bag similar to FIG. 1 but showing the bag opened by the front panel being pulled and separated along the perforations; and FIG. 4 is an enlarged cross-sectional view of the material from which the bag is fabricated.

DESCRIPTION OF THE PREFERRED EMBODIMENT

Referring now to the drawings, particularly FIGS. 1 and 2, there is shown a bag 10 which has a body, an open end 12, and a closed end or pinch bottom 14. The bag includes a front panel 16, a back panel 18 which is seamed as at 19, and a pair of gusseted side panels 20 and 22. The closed end 14 is V-shaped and forms what is known as a pinch bottom. It is to be noted that the front panel is shorter than the back panel.

A pair of lines of weakness or perforations 24 and 26 are provided at the junctions of each side panel 20 and 22 and the front panel 16. The lines perforations are parallel to one another, extend longitudinally between the open end 12 and the closed end 14, are spaced apart about the width of the bag and are separated or spaced apart by the front or back panel. The perforations may be of the angularly arranged saw tooth or crow's foot configuration 26 or of the dot-end-chain style. The angular perforation, as seen in FIG. 1A, allows for more consistent opening, and minimizes premature opening or tearing due to the perforation's strength. A pair of half-inch slits 25 and 27 are provided in the bag at the front of the perforations or adjacent the front end of the bag so as to ease opening of the bag.

It has been suggested that the non-perforated score lines such as 28 and 29 have a second pair of slits 30 and 31 preferably two-inches long at their front end (i.e., at the connection of the side panels 20 and 22 with the back panel 18 adjacent the open end of the bag). These additional slits are said to help ease the opening of the bag.

The bag whether having two or four slits is opened by grasping the top edge 16a of the front panel and pulling it rearwardly. Desirably the back panel 18, at least along its top edge 18a, is fixed in position as by holding it in place. The force on the front panel causes it to open along the slits and then tear along the perforations so as to separate the front panel from the bag body and expose the bag interior and items therein.

Using this system, the bag interior is exposed, food items in the opened bag can be removed without damage thereto, and if desired, condiments can be applied to them. Moreover, the torn bag can be reused as a place mat or a receptacle for the food items. The bag thus provides for the functions of carrying the item and for conveniently exposing the item for use. Thus as in FIG. 3, a hamburger such as 32 can be exposed, removed, and returned to the bag. The bag has a greater width than the items to be carried and the opening is also wider.

Referring now to FIG. 4, the bag is fabricated of a laminate material 40 which exhibits moisture and heat retention, and imprinting properties. U.S. Pat. No. 5,128,182 discloses a related, but different material and apparently the disclosed material is used in a wrap, not a bag. Desirably bags made of material disclosed herein absorb moisture from heated food as the food cools and absorb liquids or juices from the food item within the package. Absorption is achieved by a tissue layer 42. The tissue layer is bonded or secured by an adhesive layer 44 applied in a honeycomb pattern to a polycoat layer. Polycoat layer refers to a polymer such as polyethylene 46 that is coated (usually by a hot-melt process) onto the substrate, such as a tissue or an external layer 48, but the polyethylene cools to form its own layer. The polycoat layer is a substantially fluid impervious layer under the conditions of normal use and is provided for minimizing moisture and heat from the bagged food item exiting the bag through the laminate. The adhesive in layer 44 is applied in a honeycomb pattern so as to form pockets such as 45 that enhance the heat retention properties of the bag and maximize the retention of heat from the food item in the package and minimize cooling thereof. Logos, corporate names, and other printing can be applied to the external layer 48. This layer is intended to be the exposed or external bag layer and may be perceived as the substrate for the polycoat.

This entire laminate is formed by known laminating techniques. Specifications for various layers are as follows: tissue—an machine grade sandwich wrap goods with increased sizing for better release; polycoat is a tissue material which is coated with white low density polyethylene; and adhesive is a vinyl emulsion for bonding the substrate and withstanding degradation from greasy products.

The laminate 40 is longitudinally perforated along the score or junction lines using a perforation pattern that is at an angle to the score line and alternates back and forth to form a saw-tooth like pattern when torn. Each perforation is about a ¼ inch long. An alternate chain style pattern includes a 0.125 inch long perforation and a 0.0156 inch land area, web. The laminate is then formed into a bag by known bagmaking techniques and so that the perforations are aligned with the folds that form the junctions of each side panel 20 and 22 with the front panel 16.

In use the formed bag is loaded with a food item such as a hamburger 32. The customer then carries the bagged item to an eating area and lays the bag down with the bag back panel on the table or support surface and the front panel facing upwardly. The bag can then be torn open by grasping the front panel and separating the front panel from the side panels along the slits and perforations so as to expose the food item. Then the sandwich can be removed and condiments, if desired, can be applied to the food item and then the item eaten. If so desired, the torn bag can be formed into a place mat so as to receive the food item during the meal and the bag thus reused.

Although the invention has been described with respect to a preferred embodiment, changes and modifications can be made which are within the spirit and scope of the invention.

We claim as our invention:

1. A bag for use in carrying, exposing and removing a food item having a width, which bag includes an open end and a V-shaped closed end, a front panel, a back panel, a pair of gusseted side panels each of which is joined to the front and back panels, and said side panels, front and back panels cooperatively joined to form the closed end:

said bag having a width greater than the width of an item to be carried in the bag;

said bag including a pair of lines of perforations spaced from each other, with one located where one of the front and back panels and one of the side panels are joined;

the other line of perforations located where the other side panel and the panel selected from the front and back panels are joined;

said perforation lines being spaced apart a distance substantially equal to the width of the panel selected from the front and back panels;

said bag also defining a pair of slits, each slit extending from the open end of the bag to one of the lines of perforations and along a position where a side panel and the panel selected from the front and back panels are joined;

whereby the bag can be opened by tearing the selected panel along the slits and perforations from the rest of the bag so as to expose a food item carried in the bag and so that item can be removed from said bag.

2. A bag as in claim 1, said bag being fabricated of at least two sheets of material laminated together, capable of absorbing and retaining moisture and heat from a food item and of being imprinted.

3. A bag as in claim 1, wherein the panel selected from the front and back panel is the front panel so that said perforations are spaced apart the width of the front panel and said front panel is separable along the perforations so as to exposed the interior of the bag.

4. A bag as in claim 3, wherein the perforation lines are defined by a chain-style perforation pattern which includes a perforation of about 0.125 inch and with a land area of about 0.0156 inch between perforations.

5. A bag as in claim 3, wherein the perforation lines are defined by a perforation pattern which includes a plurality of perforations each angularly disposed relative to the junction of the side gusset and front wall and alternate back and forth to form a saw-tooth like pattern.

6. A bag as in claim 3, wherein the front panel is shorter than the back panel and slits leading to the perforations are about one-half inch long.

7. A bag for use in carrying, exposing and removing a food item having a width, which bag includes an open end and a V-shaped closed end, a front panel, a back panel, a pair of gusseted side panels each of which is joined to the front and back panels, and said side panels, front and back panels cooperatively joined to form the closed end; p1 said bag having a width greater than the width of an item to be carried in the bag;

said bag including a pair of lines of perforations spaced from each other, with one located where one of the front and back panels and one of the side panels are joined;

the other line of perforations located where the other side panel and the panel selected from the front and back panels are joined;

said perforation lines being spaced apart a distance substantially equal to the width of the panel selected from the front and back panels;

said bag also defining a pair of slits, each slit extending from the open end of the bag to one of the lines of perforations and along a position where a side panel and the panel selected from the front and back panels are joined;

whereby the bag can be opened by tearing the selected panel along the slits and perforations from the rest of the bag so as to expose a food item carried in the bag and so that item can be removed from said bag;

said bag being fabricated of at least two sheets of material laminated together, capable of absorbing and retaining moisture and heat from a food item and of being imprinted; and said laminate from which said bag is fabricated includes an interior tissue layer for moisture absorption, and adhesive applied in a manner so as to cooperate in forming pockets for heat retention and for bonding adjacent layers, and a polycoat layer of tissue and polyethylene bonded to the adhesive layer and being substantially heat and moisture impervious so as to retain said heat and moisture in said bag and for imprinting thereon.

8. A bag for use in carrying, exposing and removing a food item having a width, which bag includes an open end and a V-shaped closed end, a front panel and a back panel, a pair of gusseted side panels each of which is joined to the front and back panels, and said side panels, front and back panels cooperatively joined to form the closed end;

said bag having a width grater than the width of an item to be carried in the bag;

said bag including a pair of lines of perforations spaced from each other, one cooperatively associated with and located where one of the front and back panels join one of the side panels;

the other line of perforation lines located at the position where the other side panel is joined to the selected front or back panel;

said perforation lines being spaced apart a distance substantially equal to the selected front or back panel;

said bag also defining a pair of slits, each extending along the junction of a side panel and the panel selected from the front and back panels from the open end of the bag to one of lines of perforation;

whereby the bag can be opened by tearing the selected panel along the slits and perforations from the rest of the bag so as to expose a food item carried in the bag and so that item can be removed from said bag;

said bag being fabricated of a laminated material capable of absorbing and retaining moisture and heat from the food items and of being imprinted;

wherein the selected panel is the front panel so that said perforations are spaced apart the width of the front panel and said front panel is separable along the perforations so as to expose the interior of the bag;

wherein the perforation lines are defined by a perforation pattern which includes a plurality of perforations each angularly disposed relative to the places where the side and front wall join and which alternate back and forth to form a saw-tooth like pattern;

wherein said laminate from which said bag is fabricated includes an interior tissue layer for moisture absorption, and adhesive applied in a manner so as to cooperate in forming pockets for heat retention and for bonding adjacent layers, and a polycoat layer of tissue and polyethylene bonded to the adhesive layer and being substantially heat and moisture impervious so as to retain said heat and moisture in said bag and for imprinting thereon; and wherein each of the slits are about two inches long.

* * * * *